(12) United States Patent
Kuroda et al.

(10) Patent No.: US 6,325,270 B1
(45) Date of Patent: Dec. 4, 2001

(54) SOLDER REMOVING APPARATUS (75) Inventors: Takeshi Kuroda; Kaoru Katayama; Takeshi Takahashi; Naoki Watanabe, all of Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/598,495

(22) Filed: Jun. 22, 2000

(30) Foreign Application Priority Data

Jun. 25, 1999 (JP) .................................................. 11-180221

(51) Int. Cl.[7] .................................................. B23K 1/00
(52) U.S. Cl. .............................................. 228/19; 228/49.5
(58) Field of Search .................................... 228/264, 119, 228/19, 49.5; 269/903

(56) References Cited

U.S. PATENT DOCUMENTS

| | | | |
|---|---|---|---|
| 3,731,866 | * | 5/1973 | Mason et al. . |
| 4,561,586 | * | 12/1985 | Abel et al. . |
| 4,813,589 | * | 3/1989 | Palmer et al. . |
| 4,942,997 | * | 7/1990 | Sinkunas et al. . |
| 5,542,601 | * | 8/1996 | Fallon et al. . |
| 5,715,592 | * | 2/1998 | Mori et al. . |
| 6,043,458 | * | 3/2000 | Fortune . |
| 6,201,930 | * | 3/2001 | Close et al. . |

* cited by examiner

Primary Examiner—Tom Dunn
Assistant Examiner—Jonathan Johnson
(74) Attorney, Agent, or Firm—Mattingly, Stanger & Malur, P.C.

(57) ABSTRACT

A solder removing apparatus comprises a stage and a head portion. A top face of the stage is a flat surface, and the stage can arbitrarily move in a direction parallel to the top face. On the stage are arranged a first member supplying portion on which one or more first members are located, a second member supplying portion on which one or more second members are located, and a heating portion for heating a member located thereon at an arbitrary temperature. The head comprises a first head and a second head. The first head and the second head can move along the same moving axis in a direction vertical to the top face of the stage independently from each other. The first head adsorbs the first member located on the first member supplying portion and locates the first member on the heating portion. The second head adsorbs the second member located on the second member supplying portion and locates the second member on the first member located on the heating portion. The solder adhering to the second member is melted when heated by the heating portion through the first member and adheres to the first member. As a result, the solder is removed from the second member.

16 Claims, 8 Drawing Sheets

SOLDER REMOVING APPARATUS

BACKGROUND OF THE INVENTION

1. Field of the Invention

The present invention relates to a solder removing apparatus, and more particularly to a solder removing apparatus preferable for removing solder for connection formed on a connection surface of an LSI and the like.

2. Description of the Prior Art

A high density module is used in a computer product such as a large scale computer or a server. A plurality of LSIs are located on a multi-level interconnection substrate constituting a high density module. In the high density module, by connecting each LSI to the multi-level interconnection substrate through ball grid array (BGA) connection in which solder balls are used, the connection density is enhanced. In the LSI having each side of 20 mm, however, a number of solder balls used for connection is approximately 5,000. Therefore, the possibility that connection failure may occur due to unconnected state between the multi-level interconnection substrate and each connection terminal of the LSI is high. In a case where such a connection failure occurs, a repair operation is required such that the LSI is removed from the multi-level interconnection substrate and reconnection is then performed. At the time of this repair operation, since the solder adheres to the connection surface of the LSI removed from the multi-level interconnection substrate, the solder must be first removed. The solder balls are thereafter again formed on the connection surface of the LSI and the LSI is reconnected to the multi-level interconnection substrate.

SUMMARY OF THE INVENTION

In the above-described repair operation, a solder removing apparatus may be used in order to remove the solder in some cases. Here, an example of the solder removing apparatus will be described hereunder as a reference technique.

The solder removing apparatus comprises: a copper plate adsorbing head for carrying a copper plate to a heating stage; an LSI adsorbing head for carrying the LSI onto a heated copper plate; and an X-Y stage for moving each of the unused copper plate, the used copper plate, the LSI, and the heating stage in the X-Y direction. This solder removing apparatus heats the solder adhering to the connection surface of the LSI and causes the fused solder to adhere to the heated copper plate. This can remove the solder adhering on the LSI.

In this solder removing apparatus, the copper plate adsorbing head and the LSI adsorbing head are independently provided at positions distanced from each other. The two adsorbing heads independently move up and down. Further, when the X-Y stage moves in the X-Y direction, carriage of the copper plate or that of the LSI is performed. Thus, it has been found out from the analysis by the inventor that the process for removing the solder from the LSI takes time and the throughput is low.

It is therefore an object of the present invention to provide a solder removing apparatus which can improve the throughput.

To achieve this object, a solder removing apparatus according to the present invention comprises a stage and a head portion. The top face of the stage is a flat surface and the stage can be arbitrarily moved in a direction parallel to the top face. On the stage are arranged a first member supplying portion on which one or more first members are located, a second member supplying portion on which one or more second members are located and a heating portion for heating the members located thereon at an arbitrary temperature.

The head includes a first head and a second head. The first head and the second head can independently move along the same moving axis in a direction vertical to the top face of the stage. The first head adsorbs the first member located on the first member supplying portion and sets the first member on the heating portion. The second head adsorbs the second member located on the second member supplying portion and sets the second member on the first member located on the heating portion. The solder adhering to the second member is fused when heated by the heating portion through the first member and then adheres to the first member. Consequently, the solder is removed from the second member.

With this arrangement, the relative moving distance of the head with respect to the first and second members in the solder removing operation can be shortened, and the time required for the operation can be reduced, thereby improving the throughput.

DESCRIPTION OF THE PREFERRED EMBODIMENT

The structure and the operation of a solder removing apparatus according to one embodiment: of the present invention will now be described with reference to FIGS. 1 to 15.

Figure 1:
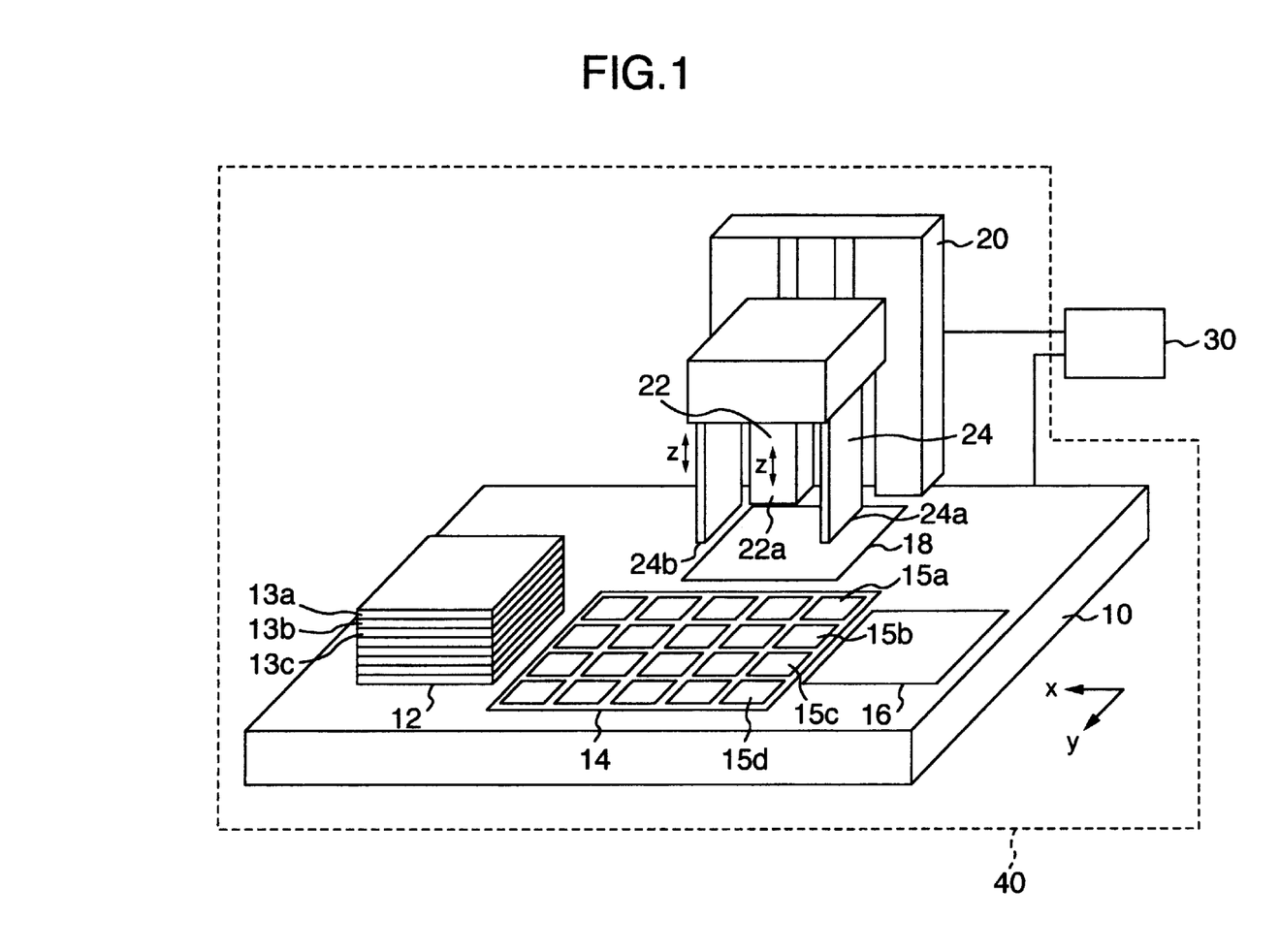
FIG. 1 is a perspective view showing the entire structure of a solder removing apparatus according to one embodiment of the present invention.

Referring to FIG. 1, the entire structure of the solder removing apparatus according to the present embodiment will be first explained.

The solder removing apparatus according to this embodiment comprises an X-Y stage 10, a head portion 20 and a control portion 30.

The X-Y stage 10 comprises a copper plate supplying portion 12, an LSI supplying portion 14, a copper plate discharging portion 16 and a heating portion 18. A plurality of new copper plates 13 (13a, 13b, 13c, . . . ) are located on the copper plate supplying portion 12. A plurality of LSIs 15 (15a, 15b, 15c, 15d, . . . ) are located on the LSI supplying portion 14. Although a number of the LSIs 15 located on the LSI supplying portion 14 is 20 in the drawing, it is not restricted to this quantity. The used copper plate to which the solder removed from the connection surface of the LSI 15 adheres is located on the copper plate discharging portion 16. The copper plates 13 and the LSIs 15 are sequentially located on the heating portion 18. The heating portion 18 heats the copper plates 13 and the LSIs 15 above the melting point of the solder adhering to the connection surface of the LSIs 15 and fuses the solder. The molten solder adheres to the copper plate 13 apart from the LSI 15. The LSI 15 from which the solder is removed is returned to the original LSI supplying portion 14. The copper plate 13 to which the solder adheres is discharged to the copper plate discharging portion 16. The X-Y stage 10 can move in an X direction and in a Y direction shown in the drawings and can locate each of the copper plate supplying portion 12, the LSI supplying portion 14, the copper plate discharging portion 16 and the heating portion 18 at places below the head portion 20. Here, the X direction and the Y direction are directions parallel to the top face (flat surface) of the stage. It is to be noted that they don't have to be completely parallel. Even if the X direction and/or the Y direction is slightly inclined with respect to the top face of the stage, it can be included in the category of parallel in this embodiment insofar long as it is substantially parallel.

Incidentally, in a case where the melting point of the solder used in the LSI is, for example, 230° C., the heating portion 18 heats the copper plate 12a and the LSI 14a to approximately 250° C. When the LSI has each side of 20 mm, the copper plate having each side of 35 mm is used.

The head portion 20 is provided with an LSI adsorbing head 22 and a copper plate adsorbing head 24. The LSI adsorbing head 22 and the copper plate adsorbing head 24 can reciprocate in a Z direction. Here, the Z direction is a direction vertical to the top face (flat surface) of the stage. It is to be noted that the Z direction does not have to be completely vertical. Even if the Z direction is slightly inclined with respect to the top face of the stage, it can be included in the category of verticality in this embodiment insofar as it is approximately vertical.

This embodiment is characterized in that the LSI adsorbing head 22 and the copper plate adsorbing head 24 are coaxially arranged. That is, the center of the moving axis when the LSI adsorbing head 22 moves along the Z direction and the center of the moving axis when the copper plate adsorbing head 24 move along the Z direction are coaxially arranged. Further, the LSI adsorbing head 22 is arranged on the inner side of the copper plate adsorbing head 24. The copper plate adsorbing head 24 is provided with adsorbing portions 24a and 24b at its ends. Among a plurality of the copper plates 13 located on the copper plate supplying portion 12, the copper plate located at the uppermost position is adsorbed by use of the adsorbing portions 24a and 24b. On the other hand, the LSI adsorbing head 22 has an adsorbing portion 22a at its end. A plurality of the LSIs 15 located on the LSI supplying portion 14 are sequentially adsorbed by using the adsorbing portion 22a. Here, the LSI adsorbing head 22 is arranged in a projection plane of the copper plate adsorbed by the adsorbing portions 24a and 24b of the copper adsorbing head 24. Therefore, the copper plate 13 can be adsorbed by the copper plate adsorbing head 24 while the LSI 15 is adsorbed by the LSI adsorbing head 22. It is to be noted that the LSI adsorbing head and the copper plate adsorbing head are provided completely independent by from each other in the prior art solder removing apparatus.

The LSI adsorbing head 22 includes therein a heater and can heat the LSI up to, for example, 150° C. According to the solder removing apparatus of this embodiment, when the copper plate 13 and the LSI 15 are located on the heating portion 18 so as to be heated, the LSI adsorbing head 22 is moved so that the LSI 15 may be in pressure contact with the copper plate 13. In this case, if the LSI adsorbing head 22 has a room temperature, the heat of the heating portion 18 is radiated from the LSI adsorbing head 22, and the temperature may not be increased above the melting point. Therefore, the LSI adsorbing head 22 itself contains the heater in order to avoid such a problem of heat radiation.

A control portion 30 controls the movement of the X-Y stage 10 along the X direction and the Y direction and also controls the movement of each of the LSI adsorbing head 22 and the copper plate adsorbing head 24 of the head portion 20. It is to be noted that the specific contents of control by the control portion 30, i.e., the operation of the solder removing apparatus according to this embodiment will be described in detail with reference to FIG. 2 and the subsequent figures.

The X-Y stage 10 and the head portion 20 are arranged in a gas purge chamber 40 in which inert gas such as nitrogen gas is filled. Therefore, the solder is prevented from being oxidized when the solder is melted by the heating portion 18.

With reference to FIGS. 2 to 15, description will be given as to the operation of the solder removing apparatus according to this embodiment.

Figure 2:
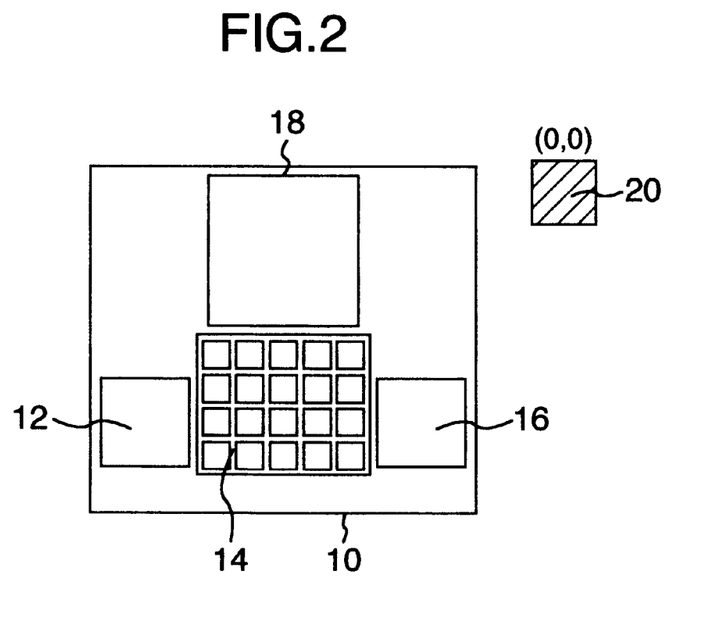
FIG. 2 is a plan view showing the initial state of a head position in the solder removing apparatus according to the embodiment of the present invention.
Figure 3:
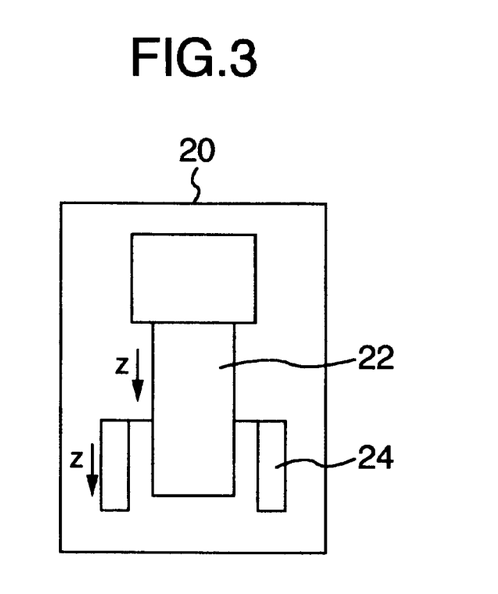
FIG. 3 is a front view showing the initial state of a head in the solder removing apparatus according to the embodiment of the present invention.

The initial state will be first explained in conjunction with FIGS. 2 and 3.

FIG. 2 is a plan view showing the initial state of a head position in the solder removing apparatus according to the present embodiment, and FIG. 3 is a front view showing the initial state of the head in the solder removing apparatus according to this embodiment. It is to be noted that like reference numerals in FIG. 1 denote like or corresponding parts.

As shown in FIG. 2, in the initial state, the head portion 20 is set at a position on the right side of the X-Y stage 10. This initial stage is determined as (0, 0). As shown in FIG. 3, in the initial state, the LSI adsorbing head 22 and the copper plate adsorbing head 24 of the head portion 20 are both lifted up to the uppermost positions thereof. Both of the LSI adsorbing head 22 and the copper plate adsorbing head 24 can move in the downward direction (Z direction) from the illustrated position.

The LSI adsorption step will now be described with reference to FIGS. 4 and 5.

Figure 4:
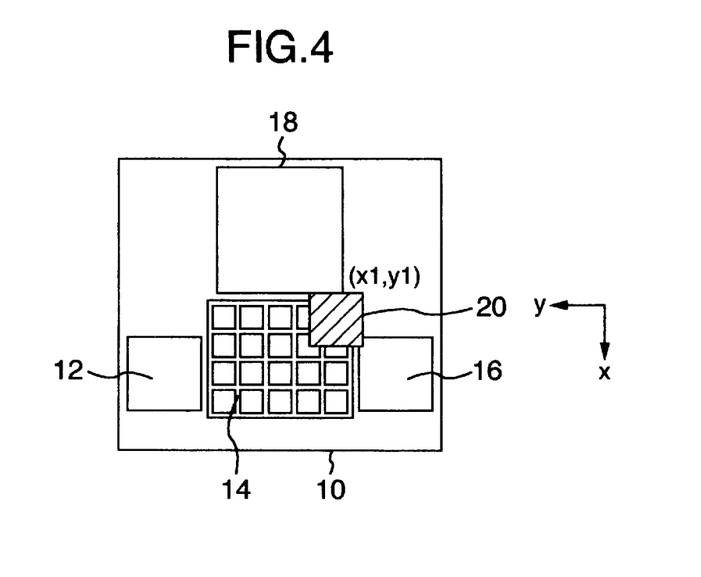
FIG. 4 is a plan view showing a head position in an LSI adsorption step.
Figure 5A:
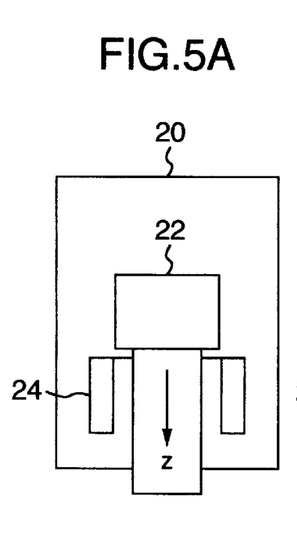
FIG. 5 is a front view showing the operation state of a head in an LSI adsorption step.
Figure 5B:
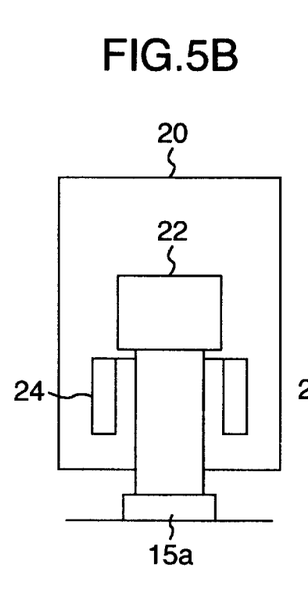
Figure 5C:
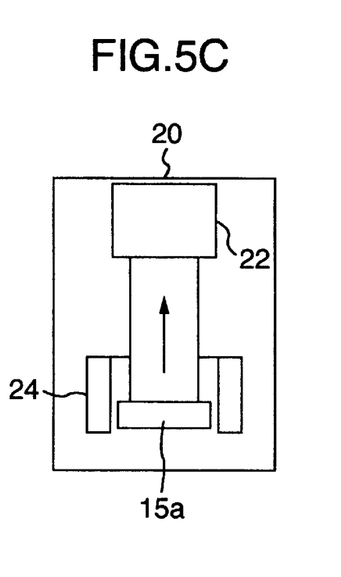

As shown in FIG. 4, in the LSI adsorption step, the control portion 30 moves in the X direction by, for example, a distance x1 and in the Y direction by, for example, a distance y1 on the X-Y stage 10. As a result, the head portion 20 is set to have a position (x1, y1) above the LSI 15a in the LSI supplying portion 14. Thereafter, as shown in FIG. 5(A), the control portion 30 moves down the LSI adsorbing head 22 of the head portion 20. As shown in FIG. 5(B), when the end of the LSI adsorbing head 22 is brought into contact with the LSI 15a, the adsorbing portion adsorbs the LSI 15a. As shown in FIG. 5(C), the LSI adsorbing head 22 then moves upward while adsorbing the LSI 15a and returns to the original uppermost position. In the LSI-adsorbing state, the connection surface of the LSI, i.e., the surface to which the solder has adhered faces downward.

Incidentally, a plurality of LSIs 15a, 15b, . . . are located in the LSI adsorbing portion 14 as shown in FIG. 1. Therefore, when the operation for removing the solder from the LSI 15a is completed in the LSI adsorption step, a next LSI-adsorbing operation is commenced while the X-Y stage is moved by the control portion 30 to a position just above LSI 15b.

The copper plate adsorption step will now be described with reference to FIGS. 6 and 7.

Figure 6:
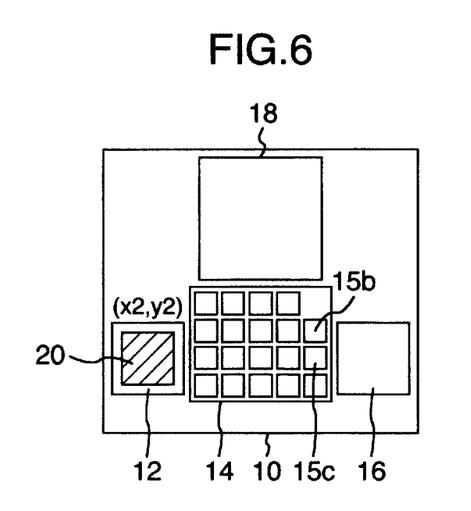
FIG. 6 is a plan view showing a head position in a copper plate adsorption step.
Figure 7A:
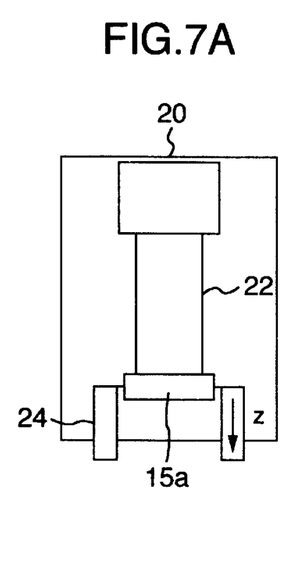
FIG. 7 is a front view showing the operation state of the head in the copper plate adsorption step.
Figure 7B:
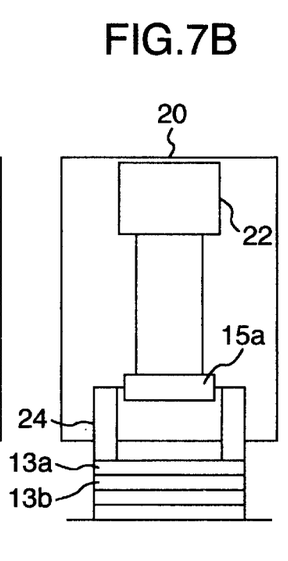
Figure 7C:
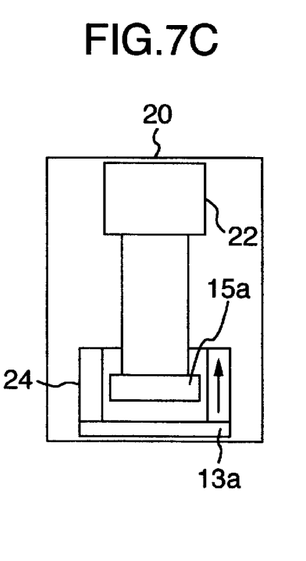

As shown in FIG. 6, in the copper plate adsorption step, the control portion 30 moves the X-Y stage 10 to thereby locate the head portion 20 above the position (x2, y2) of the copper plate supplying portion 12. Here, as described in connection with FIG. 5(C), the LSI adsorption head 22 remains adsorbing the LSI 15a. Thereafter, as shown in FIG. 7(A), the control portion 30 moves the copper plate adsorbing head 24 of the head portion 20 downward. As shown in FIG. 7(B), when the end of the copper plate adsorbing head 24 is brought into contact with the copper plate 13a at the uppermost position, the adsorbing portion adsorbs the copper plate 13a. As shown in FIG. 7(C), the copper plate adsorbing head 24 is moved upward and returns to the original uppermost position while adsorbing the copper plate 12a.

The solder suction step will now be explained in connection with FIGS. 8 and 9.

Figure 8:
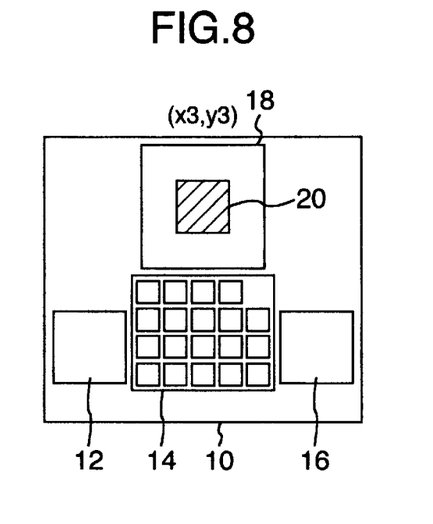
FIG. 8 is a plan view showing a head position in a solder suction step.
Figure 9A:
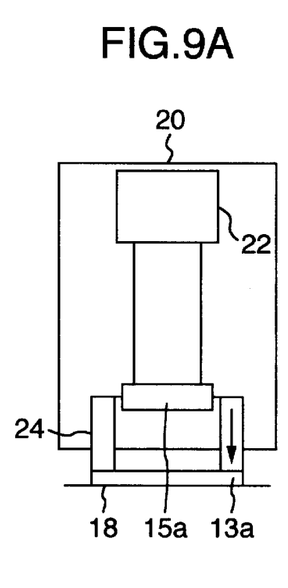
FIG. 9 is a front view showing the operation state of the head in the solder suction step.
Figure 9B:
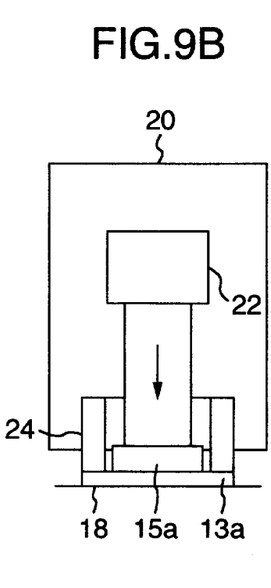
Figure 9C:
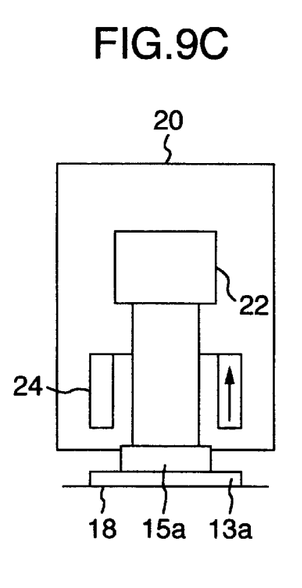

As shown in FIG. 8, in the solder suction step, the control portion 30 moves the X-Y stage 10 in the X and Y directions so that the head portion 20 may be located at a position (x3, y3) of the heating portion 18. At this time, as explained in connection with FIG. 7(C), the LSI adsorbing head 22 remains adsorbing the LSI 15a, and the copper plate adsorbing head 24 remains adsorbing the copper plate 13a. Thereafter, as shown in FIG. 9(A), the control portion 30 moves the copper plate adsorbing head 24 of the head portion 30 downward. As a result, the copper plate 13a is located on the heating portion 18. As shown in FIG. 9(B), the control portion 30 moves downward the LSI adsorbing head 22 of the head portion 20. Consequently, the LSI 15a is located on the copper plate 13a. As shown in FIG. 9(C), the copper plate adsorbing head 24 ceases the adsorption of the copper plate 13a and then move upward to return to the original uppermost position. On the other hand, the LSI adsorbing head 22 continuously pushes the LSI 15a against the copper plate 13a.

The heating portion 18 performs heating up to a temperature above the melting point of the solder. Thus, the heat is transferred to the solder on the connection surface of the LSI 15a through the copper plate 13a and the solder is melted. At this time, the LSI adsorbing head 22 is pushing the LSI 15a against the copper plate 13a. The LSI adsorbing head 22 includes the heater as described above, and heats to a temperature of, for example, 150° C. This substantially avoids the heat radiation from the LSI adsorbing head 22. However, the copper plate adsorbing head 24 is not provided with any heater. Therefore, as shown in FIG. 9(C), the copper plate adsorbing head 24 is moved up so that it does not contact with the copper plate 13a.

In the solder suction step, the solder adhering on the connection surface of the LSI 15a is melted and adheres to the copper plate 13a, so that the solder is removed from the LSI 15a. A period of time for heating the solder is approximately 20 to 30 seconds.

The suction completion step will now be described with reference to FIGS. 10 and 11.

Figure 10:
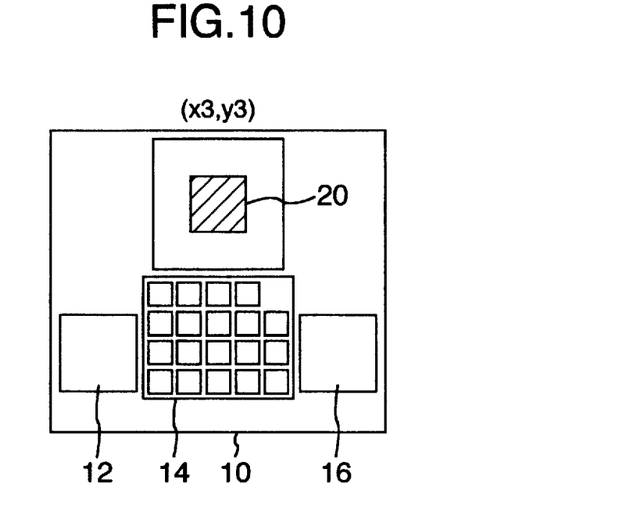
FIG. 10 is a plan view showing a head position in a suction completion step.
Figure 11A:
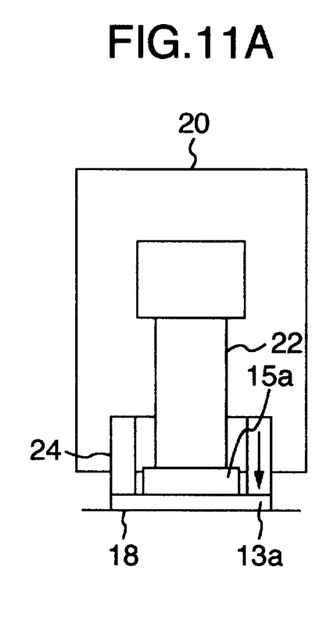
FIG. 11 is a front view showing the operation state of the head in the suction completion step.
Figure 11B:
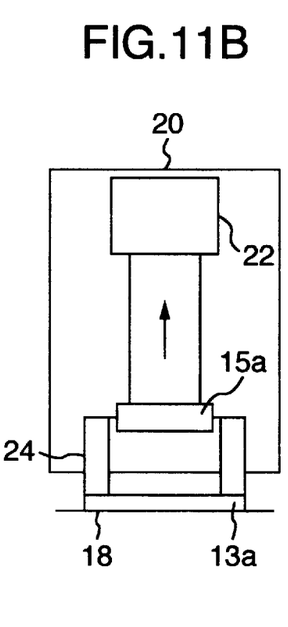
Figure 11C:
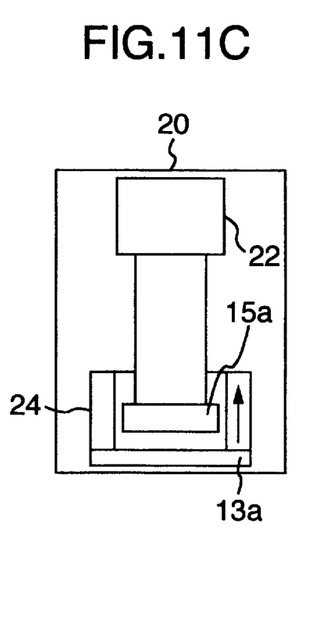

As shown in FIG. 10, in the suction completion step, the X-Y stage 10 is not moved. Similarly to the step explained regarding FIG. 8, the head portion 20 is located at the position (x3, y3) of the heating portion 18. Upon completion of the melting of the solder, as shown in FIG. 11(A), the control portion 30 moves downward the copper plate adsorption head 24 of the head portion 20. The adsorbing portion of the copper plate adsorbing head 24 is brought into contact with the copper plate 13a and adsorbs the copper plate 13a. Next, as shown in FIG. 11(B), the control portion 30 moves upward the LSI adsorbing head 22 of the head portion 20 while adsorbing the LSI 15a. The LSI adsorbing head 22 moves upward and returns to the original uppermost position. As shown in FIG. 11(C), the copper plate adsorbing head 24 then moves upward and returns to the original uppermost position while adsorbing the copper plate 13a. At this time, the melted solder adheres to the copper plate 13a and the solder having adhered to the LSI 15a is removed.

Figure 12:
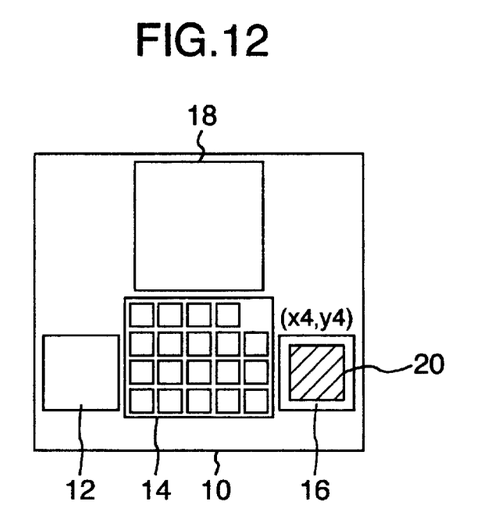
FIG. 12 is a plan view showing a head position in a copper plate discharging step.
Figure 13A:
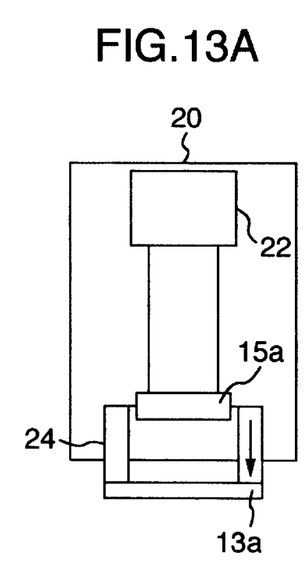
FIG. 13 is a front view showing the operation state of the head in the copper plate discharging step.
Figure 13B:
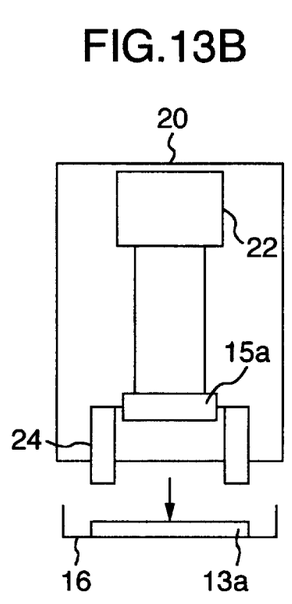
Figure 13C:
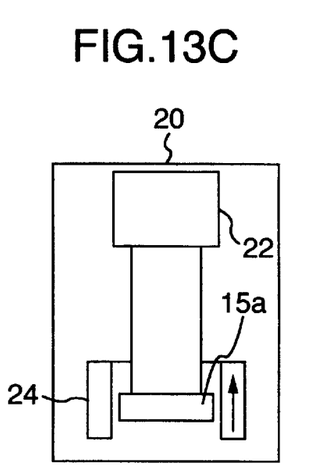

The copper plate discharge step will now be explained with reference to FIGS. 12 and 13. The control portion 30 moves the X-Y stage 10 in the X and Y directions so that the head portion 20 may be located at a position (x4, y4) of the copper plate discharge portion 16 in the copper plate discharge step as shown in FIG. 12. As described in connection with FIG. 11(C), the LSI adsorbing head 22 remains adsorbing the LSI 15a and the copper plate adsorbing head 24 remains adsorbing the copper plate 13a at this time. Thereafter, as shown in FIG. 13(A), the control portion 30 then moves downward the copper plate adsorbing head 24 of the head portion 20. As shown in FIG. 13(B), the control portion 30 subsequently ceases the adsorption of the head portion 20 by the copper plate adsorbing head 24, so that the copper plate 13a having been adsorbed by the adsorbing portion falls onto the copper plate discharging portion 16 positioned thereunder. Then, as shown in FIG. 13(C), the copper plate adsorbing head 24 is moved upward and returns to the original uppermost position.

The LSI discharge step will now be described with reference to FIGS. 14 and 15.

Figure 14:
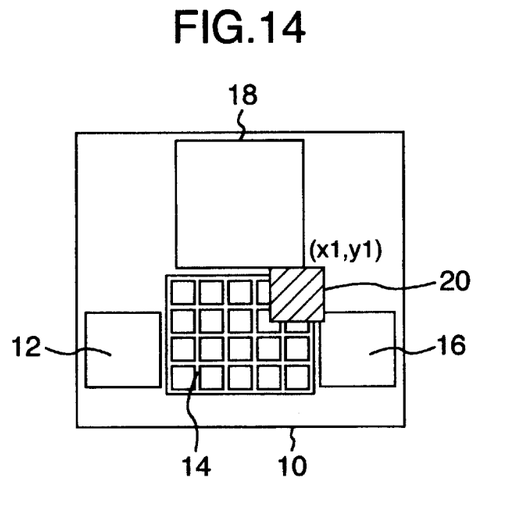
FIG. 14 is a plan view showing a head position in an LSI discharging step.
Figure 15A:
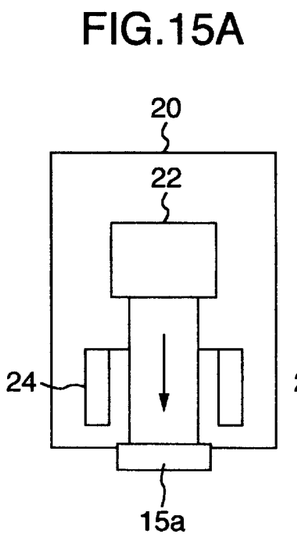
FIG. 15 is a front view showing the operation state of the head in the LSI discharging step.
Figure 15B:
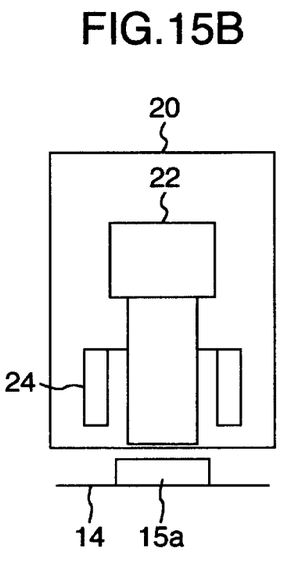
Figure 15C:
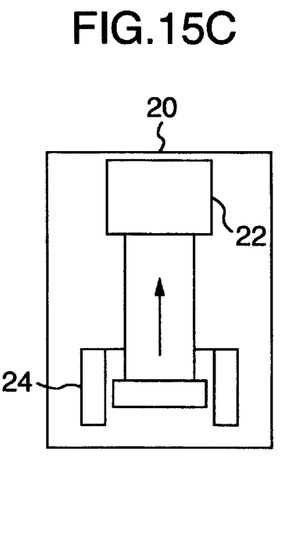

As shown in FIG. 14, in the LSI discharge step, the control portion 30 moves the X-Y stage 10 in the X and Y directions to thereby locate the head portion 20 at the position (x1, y1) of the LSI supplying portion 14. This position corresponds to the position at which the LSI 15a is adsorbed in the LSI adsorption step. Thereafter, as shown in FIG. 15(A), the control portion 30 moves downward the LSI adsorbing head 22 of the head portion 20. Then, as shown in FIG. 15(B), the control portion 30 makes the head portion 20 of the LSI adsorbing head 22 release the adsorbing. The LSI 15a having been adsorbed by the adsorbing head 22 falls to the position where the LSI 15a in the LSI supplying portion 14 was initially arranged. As shown in FIG. 15(C), the LSI adsorbing head 22 then moves upward to return to the original uppermost position.

As described above, the solder adhering to the connection surface of the LSI 15a is removed and adheres to the copper plate 13a in the steps explained with reference to FIGS. 2 to 15. The LSI 15a from which the solder had been removed is accommodated at the original position of the LSI supplying portion 14 and the copper plate 13a to which the solder adheres is discharged to the copper plate discharge portion 16. Upon completion of the above-described steps, the X-Y stage returns to the position of the initial state shown in FIG. 2. Incidentally, the X-Y stage 10 may be moved from the position shown in FIG. 14 to the position depicted in FIG. 2 to proceed with the operation for removing solder from the next LSI 15b.

As mentioned above, in this embodiment, the LSI adsorbing head 22 and the copper plate adsorbing head 24 are coaxially arranged. Therefore, the movement distance of the X-Y stage 10 in the solder removing operation can be reduced, thereby improving the throughput. This respect will be specifically explained hereinafter.

The X-Y stage 10 is moved from the position (0, 0) to the position (x1, y1) during the steps from the initial state shown in FIG. 2 to the LSI adsorbing step illustrated in FIG. 4. Therefore, the relative amount of the movement of the head portion 20 and the X-Y stage 10 is $(x1^2+y1^2)^{1/2}$. In this case, the movement in the X direction is assumed to be independent from the movement in the Y direction, so that the amount of movement (distance) from the position (0, 0) to the position (x1, y1) is assumed to be movements in the X direction by the distance x1 and in the Y direction by the distance y1 for facilitating the understanding.

The X-Y stage 10 is moved from the position (x1, y1) to the position (x2, y2) during the steps from the LSI adsorption step illustrated in FIG. 4 to the copper plate adsorption step illustrated in FIG. 6. Therefore, the relative movement distance of the head portion 20 and the X-Y stage 10 is equal to the distance (x2−x1) in the X direction and the distance (y2−y1) in the Y direction. In this case, the values of x1, x2, y1 and y2 are assumed to be x2>x1 and y2>y1 on the basis of the positional relationship shown in FIGS. 2, 4 and 6.

Similarly, the relative movement distance of the head portion 20 and the X-Y stage 10 during the steps from the copper plate adsorption illustrated in FIG. 6 to the solder suction shown in FIG. 8 is equal to the distance (x2−x3) in the X direction and to the distance (y2−y3) in the Y direction. It this case, the velues of x2, x3, y2 and y3 are assumed to be x2>x3 and y2>y3 on the basis of the positional relationship shown in FIGS. 2, 6 and 8.

The relative movement distance of the head portion 20 and the X-Y stage 10 during the steps from the suction completion shown in FIG. 10 to the copper plate discharging illustrated in FIG. 12 is equal to the distance (x4−x3) in the X direction and the distance (y3−y4) in the Y direction. In this case, the magnitude of x3, x4, y3 and y4 is assumed to be x4>x3 and y3>y4 on the basis of the positional relationship shown in FIGS. 2, 8 and 12.

The relative movement distance of the head portion 20 and the X-Y stage 10 during the steps from the copper plate discharge illustrated in FIG. 12 to the LSI discharge shown in FIG. 14 is equal to the distance (x1−x4) in the X direction and the distance (y4−y1) in the Y direction. In this case, the relationship between x1, x4, y1 and y4 is assumed to be x1>x4 and y4>y1 on the basis of positional relationship illustrated in FIGS. 2, 12 and 14.

Last, the relative movement distance of the head portion 20 and the X-Y stage 10 during the steps from the LSI discharge shown in FIG. 14 to the initial state illustrated in FIG. 2 is equal to the distance x1 in the X direction and the distance y1 in the Y direction.

As a result, the total movement distance in the X direction is 2·x1+2·x2−2·x3, and the total distance in the Y direction is 2·y2−2y3.

Here, as a reference technique, the description will now be given on the movement distance of the X-Y stage in a solder-removing apparatus in which a copper plate adsorbing head and a LSI adsorbing head are independently arranged. For example, assuming that the position of the copper plate adsorbing head in the initial state is (0, 0), the position of the LSI adsorbing head in the initial state is set to be (α0, 0). This position is on the left side of the X-Y stage 10, provided that, for example, the position of the head 20 on the right side of the X-Y stage 10 is set to be (0, 0) in the state shown in FIG. 2. In this case, it is assumed that α0>x1, x2, x3 and x4.

The entire processing step, i.e., the movement of the X-Y stage is as follows.

The X-Y stage first moves so that the copper plate adsorbing head at the position (0, 0) may have a position (x2, y2). The copper plate adsorbing head adsorbs the new copper plate from the copper plate supplying portion. When the X-Y stage moves, the copper plate adsorbing head moves to have a position (x3, y3) to locate the copper plate on the heating portion. At this time, the movement distance of the X-Y stage is equal to the distance {x2+(x2−x3)} in the X direction and to the distance {y2+(y2−y3)} in the Y direction.

The X-Y stage then moves so that the LSI adsorbing head is set to have a position (x1, y1). The LSI adsorbing head adsorbs the new LSI from the LSI adsorbing portion. When the X-Y stage moves, the LSI adsorbing head moves to a position (x3, y3) to locate the LSI on the copper plate located on the heating portion. When the copper plate adsorbing head is set to have the position (x3, y3), the LSI adsorbing head is provided at a position separated from the copper plate adsorbing head by the distance α0, and hence the initial position of the LSI adsorbing head is ((x3+α0, 0). Therefore, the movement distance of the X-Y stage is equal to the distance ((x3+α0)−x1)+(x3−x1) in the X direction and to the distance (y1−y3)+(y1−y3) in the Y direction.

Then, the X-Y stage moves so that the LSI adsorbing head is set to have a position (x1, y1). The LSI adsorbing head makes the LSI (from which the solder had been removed) return to the LSI adsorbing portion. At this time, the movement distance of the X-Y stage is equal to the distance (x3−x1) in the X direction and to the distance (y1−y3) in the Y direction.

Subsequently, the X-Y stage moves in such a manner that the copper plate adsorbing head is set to have a position (x3, y3). The copper plate adsorbing head adsorbs the copper plate to which the solder adheres. Thereafter, when the X-Y stage moves, the copper plate adsorbing head is positioned in the copper plate discharging portion of the position (x4, y4), and the copper plate is discharged. Then, by moving the X-Y stage, the copper plate adsorbing head returns to the position (α0, 0). When the LSI adsorbing head is set to have the position (x1, y1), the copper plate adsorbing head is located at a position separated from the LSI adsorbing head by the distance α0, and hence the copper plate adsorbing head is located at the position ((x1+α0), y1). Therefore, the movement distance of the X-Y stage is equal to the distance ((x1 +α0)−x3)+(x3−x4)+(α0−x4) in the X direction and to the distance (y1−y3)+(y4−y3)+y4 in the Y direction.

As a result, the total movement distance in the X direction is −2·x1+2·x2+3·α0+2·x3, and the total movement distance in the Y direction is equal to 4·y1+2·y2−6·y3+2·y4.

Therefore, in the solder removing apparatus in which the copper plate adsorbing head and the LSI adsorbing head are independently arranged, the X-Y stage moves more in the X direction by the movement distance 4(x3−x1)+3α0 and moves more in the Y direction by the movement distance 4(y1−y3)+2y4 in comparison with the solder removing apparatus embodying the invention. Here, since x3>x1 and y1>y3, the movement distances in both of the X direction and Y direction have positive values. As a result, the movement distance of the X-Y stage in the solder removing apparatus as the reference technique becomes longer. Thus, the solder removing apparatus according to this embodiment of the invention can reduce a period of time required for removing the solder from one LSI in comparison with that of the comparative, solder removing apparatus, thereby shortening the throughput of the solder removing operation. Specifically, the solder removing apparatus in this embodiment of the invention can reduce to the level of about 2 minutes the period of time required for removing the solder from one LSI although in the comparative, solder removing apparatus referred to as the reference technique, about 3 minutes are needed.

Further, in the solder removing apparatus according to this embodiment of the invention in which the copper plate adsorbing head and the LSI adsorbing head are coaxially arranged, the installation space for the head portion can be reduced to approximately ½ of that of the comparative, solder removing apparatus disclosed as the reference technique. Therefore, the gas purge chamber for accommodating the head portion and the X-Y stage can be formed to have smaller sizes. In addition, the period of time required for obtaining the nitrogen gas atmosphere in the chamber can be reduced.

Although the head portion moves in the Z direction and the X-Y stage moves in the X direction and Y direction in the above description, the head portion itself may move in the three axis directions of X, Y and Z.

Further, although the solder removing apparatus is described to remove the solder adhering to the connection surface of the LSI, it can be used for is described to remove the solder adhering to the substrate and the like.

As a plate material for causing the solder to adhere, any material other than the copper plate can be used.

What is claimed is:

1. A solder removing apparatus comprising:
    a first member supplying portion on which one or more first members are located;
    a second member supplying portion on which one or more second members are located;
    a heating portion for heating said members located therein up to an arbitrary temperature;
    a first head capable of moving in an X axis direction, in a Y axis direction and in a Z axis direction relatively to said first member supplying portion, to said second member supplying portion and to said heating portion, said first head adsorbing said first member located on said first member supplying portion and locating said first member on said heating portion;
    a second head capable of moving in said X axis direction and in said Y axis direction integrally with said first head, which second head is capable of moving in the X axis direction independently from said first head, said second head adsorbing said second member located on said second member supplying portion, and locating said second member on said first member located on said heating portion, and said second head adsorbing said second member located on said first member located on said heating portion and locating said second member on said second member supplying portion; and
    a control portion for controlling relative movement of each said first head and said second head to said first member supplying portion, to said second member supplying portion and to said heating portion,
    solder adhering to said second member is melted when heated by said heating portion through said first member and adheres to said first member, whereby said solder is removed from said second member.

2. The solder removing apparatus according to claim 1, further comprising a first member discharging portion on which said first member having solder adhering thereto is located, said first head adsorbing said fist member located on said heating portion and locating said first member on said first member discharging portion.

3. The solder removing apparatus according to claim 1, wherein said second head is provided with a heater, said heater heating said second member adsorbed by said second head up to an arbitrary temperature.

4. The solder removing apparatus according to claim 1, wherein a moving axis for movement of said first head in said Z axis direction coincides with a moving axis for movement of said second head in said Z axis direction.

5. The solder removing apparatus according to claim 1, wherein said first head is provided with at least two portions, and each portion of said first head is arranged around said second head.

6. A solder removing apparatus comprising:
    a first member supplying portion on which one or more first members are located;
    a second member supplying portion on which one or more second members are located;
    a heating portion for heating members located therein up to an arbitrary temperature;
    a first head capable of moving in a substantially parallel direction and in a substantially vertical direction relatively to each of said first member supplying portion, said second member supplying portion, and said heating portion, said first head adsorbing said first member located on said first member supplying portion and being moved to locate said first member on said heating portion;
    a second head capable of moving in a substantially parallel direction and in a substantially vertical direction relatively to each of said first member supplying portion, said second member supplying portion, and said heating portion, said second head being moved in said substantially vertical direction along the same axis as a moving axis for said first head moved in said substantially vertical direction and being also moved in said substantially parallel direction in cooperation with said first head, said second head adsorbing said second member located on said second member supplying portion and being moved to locate said second member on said first member located on said heating portion, said second head adsorbing said second member located on said first member located on said heating portion and being moved to locate said second member on said second member supplying portion; and
    a control portion for controlling relative movement of each of s aid first head and said second head to any one of said first member supplying portion, said second member supplying portion and said heating portion;
    wherein solder adhering to said second member is melted when heated by said heating portion through said first member and adheres to said first member, whereby said solder is removed from said second member.

7. The solder removing apparatus according to claim 6, further comprising a first member discharging portion on which said first member having solder adhering thereto is located, said first head adsorbing said first member located on said heating portion and being moved to locate said first member on said first member discharging portion.

8. The solder removing apparatus according to claim 6, wherein said second head is provided with a heater, said heater heating up to an arbitrary temperature said second member adsorbed by said second head.

9. The solder removing apparatus according to claim 6, wherein said first head is provided with at least two portions, each portion of said first head being arranged around said second head.

10. The solder removing apparatus according to claim 6, further comprising a head portion, said head portion being capable of moving in a substantially parallel direction and in a substantially vertical direction relatively to each of said first member supplying portion, said second member supplying portion, and said heating portion in compliance with control by said control portion, said first head and said second head being integrally formed in said head portion, said first head and said second head being moved together in said substantially parallel direction at the time of movement of said head portion and being moved in said substantially vertical direction independently from each other.

11. A solder removing apparatus comprising:

a stage having a flat, top face, said stage being capable of arbitrarily moving in a direction parallel to said flat face;

a first member supplying portion provided on said top face of said stage, on which one or more first members are located;

a second member supplying portion provided on said top face of said stage, on which one or more second members are located;

a heating portion provided on said top face of said stage, for heating a member located thereon up to an arbitrary temperature;

a head provided with a first head and a second head, each of said first head and said second head being capable of moving along the same moving axis in a direction vertical to said top face of said stage independently from each other;

said first head adsorbing said first member located on said first member supplying portion and located said first member on said heating portion;

said second head adsorbing said second member located on said second member supplying portion and locating said second member on said first member located on said heating portion, said second head adsorbing said second member located on said first member on said heating portion and locating said second member on said second member supplying portion; and a control portion for controlling movement of each of said stage, said first head and said second head;

wherein solder adhering to said second member is melted when heated by said heating portion through said first member and adheres to said first member, whereby said solder is removed from said second member.

12. The solder removing apparatus according to claim 11, further comprising:

a first member discharging portion provided on said top face of said stage, on which portion said first member having solder adhering thereto is located, said first head adsorbing said first member located on said heating portion and then locate said first member on said first member discharging portion.

13. The solder removing apparatus according to claim 11, wherein said second head is provided with a heater, said heater heating said second member adsorbed by said second head up to an arbitrary temperature.

14. The solder removing apparatus according to claim 11, wherein said first head is provided with at least two portions, each portion of said first head being arranged around said second head.

15. The solder removing apparatus according to claim 12, wherein said control portion moves said stage to locate said first member supplying portion under said head portion, moves downward said first head to thereby adsorb said first member, again moves upward said first head and then moves said stage to locate said second member supplying portion under said head portion, moves downward said second head to adsorb said second member, again moves upward said second head and then moves said stage to locate said heating portion under said head, moves downward said first head to locate said first member on said heating portion, moves downward said second head to locate said second member on said first member, moves upward said second head adsorbing said second member and moves upward said first head adsorbing said first member after a period of time enough to cause solder adhering to said second member to adhere to said first member elapsed, subsequently moves said stage to locate said first member discharging portion under said head, moves downward said first head to locate said first member on said first member discharging portion, further moves said stage to locate said second member supplying portion under said head, and moves downward said second head to locate said second member on said second member supplying portion.

16. The solder removing apparatus according to claim 15, wherein, after locating said first member on said heating portion, said control portion releases adsorption regarding said first head and moves upward said first head, and, on the other hand, after locating said second member on said first member, said control portion causes said second head to push said second member against said first member.

* * * * *